(12) United States Patent
Matsuo et al.

(10) Patent No.: US 7,160,948 B2
(45) Date of Patent: Jan. 9, 2007

(54) POLYMER ALLOY INCLUDING POLYLACTIC ACID

(75) Inventors: Toshiaki Matsuo, Hitachi (JP); Takayuki Matsumoto, Hitachi (JP); Naruyasu Okamoto, Tokyo (JP); Ryuuji Kajiya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 332 days.

(21) Appl. No.: 10/919,522

(22) Filed: Aug. 17, 2004

(65) Prior Publication Data

US 2005/0192405 A1 Sep. 1, 2005

(30) Foreign Application Priority Data

Feb. 27, 2004 (JP) ............... 2004-053957

(51) Int. Cl.
*C08L 53/00* (2006.01)
(52) U.S. Cl. .................. 525/92 R; 252/92 L
(58) Field of Classification Search .............. 525/92 R, 525/92 L
See application file for complete search history.

(56) References Cited

U.S. PATENT DOCUMENTS 5,216,050 A * 6/1993 Sinclair .................. 524/108
5,883,199 A * 3/1999 McCarthy et al. .......... 525/437

FOREIGN PATENT DOCUMENTS

JP 6-245866 9/1996
JP 09235455 A * 9/1997

OTHER PUBLICATIONS

JP 09235455 A English translation of abstract.*
Ray, Suprakas Sinha, et al. "New Polyactide/Layered Silicate Nanocomposites," Macromolecules 2002, 35, pp. 3104-3110. 2002 American Chemical Society, Published on Web Mar. 9, 2002.
Gajria, Ajay M. "Miscibility and biodegradability of blends of poly(lactic acid) and poly(vinyl acetate)." POLYMER, vol. 37, No. 3, 1996, pp. 437-444.

* cited by examiner

*Primary Examiner*—Randy Gulakowski
*Assistant Examiner*—Alicia M. Toscano
(74) *Attorney, Agent, or Firm*—McDermott Will & Emery LLP

(57) ABSTRACT

The object of the present invention is to provide a polymer alloy including polylactic acid which can be used in the same manner as conventional commodity plastics even in an environment of high temperature and high humidity. According to the present invention, there is provided a polymer alloy including polylactic acid comprising (A) a polylactic acid, (B) a polyalkylacrylic ester and/or a polyvinyl ester, (C) a polyolefin and (D) a block copolymer of a polyalkylacrylic ester and polyolefin and/or a block copolymer of a polyvinyl ester and a polyolefin.

12 Claims, No Drawings

POLYMER ALLOY INCLUDING POLYLACTIC ACID

INCORPORATION BY REFERENCE

The present application claims priority from Japanese application JP2004-053957 filed on Feb. 27, 2004, the content of which is hereby incorporated by reference into this application.

BACKGROUND OF THE INVENTION

The present invention relates to a polymer alloy including polylactic acid, and particularly to a novel commodity resin composition which hardly adversely affects the environment. The resin composition of the present invention is used for preparing various molded articles as commodity resins are used therefor.

Polylactic acid is a colorless, transparent polyester prepared using, as a starting material, lactic acid which is a biomass, and is known as a plastic material which hardly causes adverse effects on environments in disposal (for example, incineration) of waste products such as molded articles. Therefore, use of it as commodity resins for preparing various molded articles is now under consideration.

Polylactic resins have problems in physical properties, for example, (1) they are low in shock-proof because they are hard and fragile, (2) they are apt to undergo thermal transformation because the glass transition temperature is not so high (about 60° C.), and (3) they are apt to cause hydraulic degradation in environment of high-temperature and high-humidity. It is considered that these problems hinder the application and practical utilization of them as materials which are required to have a long lifetime.

The above problem (1) on shock-proof can be solved by mixing the polylactic resins with aliphatic polyesters which have low melting point and are soft, such as polybutylene succinate (PBS) (cf. JP-A-8-245866). The above problem (2) on thermal transformation can be solved by dispersing a nucleator such as fine montmorillonite to make the polylactic acid easy in crystallization (cf. Suprakas Sinha Ray, et al., "Macromolecules", 35, p3104, 2002). However, as to the problem (3), effective solution has not yet been found.

On the other hand, Ajay M. Gajria, et al have proved that a mixture of polylactic acid and polyvinyl acetate at 7:3 has a decomposition rate which is 1/200 or less that of pure polylactic acid in hydrolysis test using an enzyme in an environment of 37° C. (cf. "Polymer", 37, p437, 1996). The authors have considered that the reduction of decomposition rate is due to the decrease of deposition of decomposition enzyme on molded articles caused by mixing polylactic acid with polyvinyl acetate which lowers surface tension.

However, this technology cannot completely prevent the hydrolysis, and the hydrolysis proceeds even in the absence of enzyme in an environment of further higher temperature and humidity (water content). Thus, this measure is insufficient for solution of the problem. Moreover, commodity plastics such as polystyrene and polypropylene which are expected to provide a long lifetime even in the environment of high temperature and humidity have no oxygen atom in the molecule, and hence they have no compatibility with polyesters having oxygen atom in the molecule such as polylactic acid and cannot be admixed with polylactic acid. Therefore, further countermeasures are necessary to use polylactic acid in the same manner as commodity plastics.

The object of the present invention is to obtain a resin composition excellent in shock-proof and thermal transformation resistance and having sufficiently lowered hydrolyzability by blending polylactic acid with a suitable resin component, and thus the present invention provides a polymer alloy including polylactic acid which can be used in the same manner as conventional commodity plastics even in environment of high temperature and high humidity.

SUMMARY OF THE INVENTION

The present invention provides a composition comprising (A) a polylactic acid which is blended with a polyalkylacrylic ester and/or a polyvinyl ester, (c) a polyolefin (including a derivative), and (D) a block copolymer containing a block of an alkylacrylic ester and a block of an olefin (including a derivative) and/or a block copolymer containing a block of a vinyl ester and/or a block of an olefin (including a derivative).

According to the present invention, there can be provided a novel polymer alloy including polylactic acid having substantially no adverse effect on environments and highly inhibited from hydrolysis by admixing a polylactic acid with a suitable commodity plastic. This composition can be used in environments and under conditions similar to those for commodity plastics.

Other objects, features and advantages of the invention will become apparent from the following description of the embodiments of the invention.

DETAILED DESCRIPTION OF THE INVENTION

A polyvinyl ester such as polyvinyl acetate or a polyalkylacrylic ester such as polymethyl methacrylate has oxygen atom in its molecule which lowers a difference in cohesive energy between its molecule and polylactic acid molecule and has a compatibility with polylactic acid, and, hence, polylactic acid can be easily and sufficiently admixed with the polyvinyl ester and the polyalkylacrylic ester. The inventors have considered that plastics which are cheap and hardly adversely affect the environment as a whole can be provided by mixing a mixture of a polylactic acid and a polyvinyl ester or a polyalkylacrylic ester with a polyolefin resin used as a commodity resin.

However, in the case of the above composition as it is, the polylactic acid cannot be admixed with the polyolefin such as polystyrene or polypropylene or a derivative thereof. Under the circumstances, it has been found that when the mixture of polylactic acid and polyvinyl ester or a polyalkylacrylic ester is further mixed with a block copolymer containing blocks of an alkylacrylic ester and an olefin (including a derivative) or a block copolymer containing blocks of a vinyl ester and an olefin (including a derivative), the polylactic acid can easily admix with other components. That is, it is important that a block having compatibility with polylactic acid is present at one terminal of the block copolymer and a block having compatibility with polyolefin is present at another terminal of the block copolymer.

The above copolymer has compatibility with both the polyalkylacrylic ester or polyvinyl ester and the polyolefin or derivative thereof and they easily admix with each other. Therefore, polylactic acid can be admixed with a polyolefin or a derivative thereof by means of the two component admixing agents, namely, the polyalkylacrylic ester or polyvinyl ester and the block copolymer.

Commodity plastics of polyolefins such as polystyrene, polypropylene and polybutadiene or derivatives thereof contain a double bond between carbon atoms in their monomer molecules (styrene, propylene, etc.), and when the double bond opens and the bond links with other molecule, the polymerization reaction proceeds (additional polymerization reaction).

On the other hand, lactic acid and lactide which are starting materials for polylactic acid have no double bond between carbon atoms in the molecule. Therefore, lactic acid and lactide cannot produce a block copolymer with monomers of the above commodity plastics, while the starting monomer molecule for polyalkylacrylic ester or polyvinyl ester has a double bond between carbon atoms, and there is the possibility of being able to produce the block copolymer of the commodity plastic. Therefore, an admixing agent of block copolymer containing a block of alkylacrylic ester or vinyl ester is necessary for admixing polylactic acid with the commodity plastic.

It is known that the additional polymerization reaction includes three kinds of reactions, namely, radical additional polymerization reaction, cationic additional polymerization reaction (including coordination polymerization using Ziegler-Natta catalysts, etc.) and anionic additional polymerization reaction. All of these three additional polymerization reactions are possible for styrene or dienes such as isoprene and butadiene, and two of the radical polymerization reaction and anionic polymerization reaction are possible for alkylacrylic ester. Only the radical additional polymerization reaction is possible for vinyl ester. Two of the cationic and radical additional polymerization reactions are possible for ethylene. Only the cationic additional polymerization reaction is possible for propylene. Therefore, usually, direct synthesis of a copolymer is possible only with the combination of monomers which are common in the possible addition reaction.

In the present invention, when a copolymer of a combination of monomers having no common reaction is produced, it is considered that there is a method of carrying out reaction of monomers which are possible in both reactions between the addition reactions of each of the said monomers which are components of the copolymer. For example, in the case of vinyl ester possible in radical polymerization reaction and propylene possible in cationic polymerization reaction, first, propylene is cationically polymerized, followed by adding styrene or a diene such as butadiene which is possible in all reactions or ethylene which is possible in cationic additional polymerization and radical additional polymerization. Thus, there is produced a diblock copolymer of propylene and styrene, ethylene or diene. Here, the reaction is once stopped, and after the reaction is changed to radical additional polymerization reaction, vinyl acetate as one of the vinyl esters is added, whereby a triblock copolymer of propylene—styrene, ethylene or diene—vinyl acetate is produced, which can have a function of an admixing agent which is substantially the same as the function of vinyl ester—propylene block copolymer.

By admixing a polylactic resin with a commodity plastic in accordance with the above method, the mixed resin can be used in the same environments and under the same conditions as for commodity plastics. It is clear that the above two block copolymers may be admixed simultaneously.

The polylactic acid is represented by the formula (1), wherein n is preferably $10^2$–$10^4$, and when the molecular weight is in this range, the polylactic acid has sufficient strength and easily admixes with other components.

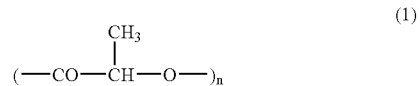

The polyalkylacrylic ester is represented by the formula (2), wherein n is preferably $10^1$–$10^5$, and when the molecular weight is in this range, mechanical characteristics and miscibility are satisfactory. When $R_1$ and $R_2$ are $CH_3$—, the polyalkylacrylic ester is polymethyl methacrylate, which is a preferable material in the present invention. When $R_1$ is H— and $R_2$ is $CH_3$—, the polyalkylacrylic ester is polymethyl acrylate, and when $R_1$ is $CH_3$— and $R_2$ is $C_2H_5$—, the polyalkylacrylic ester is polyethyl methacrylate.

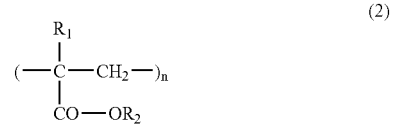

The polyvinyl ester is represented by the formula (3), wherein n is preferably $10^1$–$10^5$ because in this case miscibility and physical characteristics are well balanced. When R is $C_3$—, the polyvinyl ester is polyvinyl acetate, which is a preferable material in the present invention. When R is H—, the polyvinyl ester is polyvinyl formate, and when R is $CH(CH_3)$—, the polyvinyl ester is polyvinyl isobutyrate.

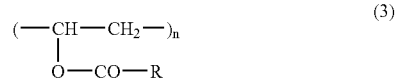

The polyolefin (including a derivative) is represented by the formula (4), wherein n is preferably $10^1$–$10^6$. When R is $CH_3$, the polyolefin is polypropylene, and when R is $C_6H_5$, it is polystyrene. These are both preferable materials in the present invention. When R is H—, the polyolefin is polyethylene, when R is $CH_2$=$CH$—, it is polybutadiene, and when R is CN—, it is polyacrylonitrile. In the polyolefin of the formula (4), there may coexist monomers in which R represents two or more hydrocarbon groups, for example, $CH_3$ and $C_6H_5$.

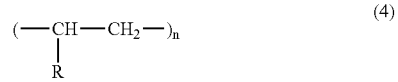

The block copolymers of alkylacrylic ester and olefin (including a derivative) are represented by the formulas (5) and (6), wherein m is preferably $10^1$–$10^5$ and n is preferably $10^0$–$10^4$. When $R_1$ and $R_2$ are $CH_3$, and $R_3$ is $C_6H_5$, the block copolymer is a methyl methacrylate—styrene copolymer, which is preferred in the present invention. In the formulas (5) and (6), as $R_3$, there may coexist two or more olefin residues, for example, $CH_3$ and $C_6H_5$.

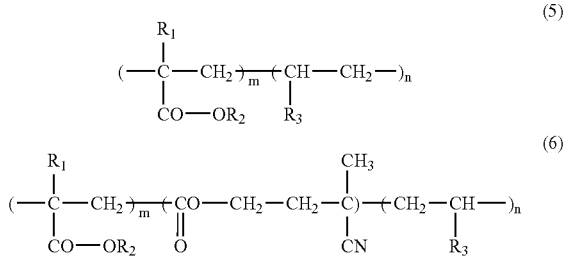

The block copolymer of polyvinyl ester and polyolefin (including a derivative) is represented by the formula (7), wherein k is preferably $10^0$–$10^4$, m is preferably $10^1$–$10^5$ and n is preferably $10^0$–$10^6$. When $R_1$ is $CH_3$— and $R_2$ is $C_6H_5$, the block copolymer is a block copolymer of vinyl acetate and styrene, which is preferred in the present invention.

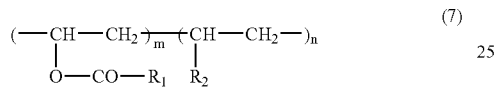

The block copolymers containing blocks of vinyl acetate and olefin (including a derivative) are represented by either one of the formulas (8)–(10), wherein k is preferably $10^0$–$10^6$, m is preferably $10^1$–$10^5$ and n is preferably $10^0$–$10^6$. The block copolymer of vinyl acetate, ethylene and propylene is represented by the formula (9) wherein $R_1$ and $R_2$, are $C_3$—, and k is preferably $10^0$–$10^6$, m is preferably $10^1$–$10^5$ and n is preferably $10^0$–$10^6$.

The block copolymer of vinyl acetate, isoprene and propylene is represented by the formula (10) wherein $R_1$ and $R_2$ are $C_3$—, and k is preferably $10^0$–$10^6$, m is preferably $10^1$–$10^5$ and n is preferably $10^0$–$10^6$. The block copolymer of vinyl acetate, butadiene and propylene is represented by the formula (10) wherein R, and $R_2$ are $CH_3$ and $R_3$ is H— and k is preferably $10^0$–$10^6$, m is preferably $10^1$–$10^5$ and n is preferably $10^0$–$10^6$.

As $R_3$ in the formula (6), $R_2$ in the formula (7) and $R_2$ in the formulas (8)–(10), there may coexist two or more olefin residues, for example, $CH_3$ and $C_6H_5$.

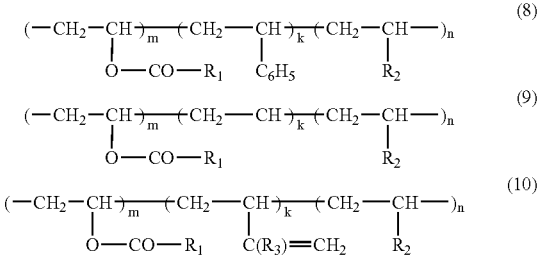

The polymer alloy including polylactic acid of the present invention is preferably one in which the block copolymer of polyalkylacrylic ester and polyolefin is a copolymer of polymethyl methacrylate and polystyrene which has a polyalkylacrylic ester block and a polyolefin block at both terminals.

Furthermore, the polymer alloy including polylactic acid of the present invention is preferably one in which the block copolymer of polyalkylacrylic ester and polyolefin is a block copolymer of polymethyl methacrylate and polypropylene which has a polyalkylacrylic ester block and a polyolefin block at both terminals.

Blending ratio of the components in the composition of the present invention is optionally selected depending on use of the composition, cost, performances, etc. Various organic and inorganic fillers, coupling agents, lubricants, flame retardants, etc. may be added to the composition depending on uses of the composition. In the composition, the blending ratio of (A)polylactic acid, (B) polyacrylic acid ester or polyvinyl ester, (C) polyolefin, and (D) block copolymer of (B) and (C) is 5–30% by weight of (A), 20–50% by weight of (B), 5–20% by weight of (C) and 20–50% by weight of (D) based on 100 of (A)+(B)+(C)+(D).

DESCRIPTION OF PREFERRED EMBODIMENTS

The present invention will be explained by the following examples.

EXAMPLE 1

As a specific example of application of the present invention, one example of a method of preparation of a polymer alloy including polylactic acid will be explained. This example relates to a composition comprising polylactic acid, polymethyl methacrylate which is one of polyalkylacrylic methacrylates, polystyrene and block copolymer of methyl methacrylate and styrene.

First, synthesis of the block copolymer of methyl methacrylate and styrene is explained. One gram of di-t-butyl-4,4'-azobis-4-cyanoperoxyvaleric acid which is one of initiators with multi-functional groups is added to 135 g of styrene at 60° C. in a nitrogen atmosphere and these are stirred as they are for 4 hours. As a result, the double bond between carbon atoms in the styrene molecule opens to bring about a radical polymerization. The product is dissolved in benzene and methanol is added to the solution, resulting in precipitation of polystyrene (prepolymer). To 2 g of the polystyrene are added 5 g of methyl methacrylate and 0.1 g of tetraethylenepentamine at 28° C. in a nitrogen atmosphere, followed by stirring for 24 hours.

As a result, the double bond between carbon atoms in the molecule of methyl methacrylate opens to allow the methyl methacrylate to link to the prepolymer, and addition of methyl methacrylate further proceeds with radical polymerization reaction. Methanol is added thereto to precipitate the produced polymer, which is then dried. The dried product is subjected to Soxhlet extraction with cyclohexane and acetonitrile. In this process, a block copolymer of methyl methacrylate and polystyrene which is a desired product is produced, and additionally, a homopolymer of styrene remaining without addition of methyl methacrylate (polystyrene) and a homopolymer of only the methyl methacrylate (polymethyl methacrylate) are also produced and contained.

When an initiator with multi-functional groups is used as in this example, since the polymerization reaction proceeds on both sides of the molecule of the polymerization initiator interposed between the methyl methacrylate and the styrene, the molecular structure of the resulting copolymer is as shown in the formula (7). Furthermore, in this case, methyl methacrylate and styrene both can perform radical reaction and anionic reaction and hence it is possible to produce a block copolymer in the form of not interposing the initiator with multi-functional groups. However, it is known that the anionic additional polymerization reaction of styrene is relatively low in activity, and it is desirable to select the production by radical reaction.

Then, to the resulting product is added 2.5 g of polylactic acid at 190° C. in a nitrogen atmosphere, followed by stirring for 0.5 hour. As a result, polylactic acid admixes with methyl methacrylate and further admixes with polystyrene through the block copolymer. Thus, there is obtained an admixture of polylactic acid, polymethyl methacrylate, polystyrene and a block copolymer of methyl methacrylate and polystyrene. Composition of this resin composition is as follows: 26.3% by weight of polylactic acid, 26.3% by weight of polymethyl methacrylate, 11.6% by weight of polyolefin and 35.8% by weight of block copolymer. When the content of polystyrene is to be increased, polystyrene may be further added to the above composition, followed by stirring for 0.5 hour.

EXAMPLE 2

Next, another example of synthesis method of a polymer alloy including poly-lactic acid is explained as a specific application example of the present invention. In this example, explanation is made of an admixture of polylactic acid, polyvinyl acetate which is one of polyvinyl esters, polypropylene and block copolymer of vinyl acetate and propylene.

First, explanation is made on synthesis of a block copolymer of vinyl acetate and propylene-styrene copolymer. A cation polymerization initiator is added to 250 ml of anhydrous heptane in a nitrogen atmosphere of room temperature, and further 6 mmols of triethyl-aluminum diluted to 10 wt % with heptane is added, followed by stirring. As the polymerization initiator, there are metal chlorides such as titanium chloride (III) and aluminum chloride (III), and, in this case, titanium chloride (III) is especially preferred (amount: 0.5 g). Thereafter, nitrogen gas is removed by a vacuum pump, and then the product is heated and kept at 43° C., followed by contacting with propylene gas for 3 hours under a pressure of 1 atm to absorb propylene. The double bond between carbon atoms in the absorbed propylene molecule opens and a cation additional polymerization reaction proceeds. Here, 2.5 g of styrene is added, and the temperature is kept and the stirring is carried out for 1 hour. Thus, styrene adds cationically to the head of polypropylene. Thereafter, in order to terminate the polymerization reaction, 1 liter of methanol with hydrochloric acid is added, followed by stirring for 5 hours. As a result, titanium chloride (III) and triethylaluminum are dissolved to precipitate polypropylene and propylene-polystyrene block copolymer, which are taken out by filtration.

Then, 0.48 g of 2,2'-azobis(isobutyro-nitrile) and 0.36 g of benzoyl peroxide are dissolved in 250 ml of tetrahydrofuran, and the above precipitate is added to the solution and dissolved therein. Thus, the double bond between carbon atoms of the styrene molecule present at terminal of the propylene-styrene diblock copolymer opens to give a state where radical polymerization reaction can be started. Thereto is added 50 g of vinyl acetate, and the temperature is raised to 60° C. while stirring in a nitrogen atmosphere and this state is maintained for 5 hours. As a result, there proceed a reaction of radical addition of the vinyl acetate molecule to the styrene molecule and a radical addition reaction on the homopolymer of vinyl acetate.

Thereafter, in order to terminate the radical polymerization, a small amount of a polymerization inhibitor is added to terminate the polymerization reaction. As the polymerization inhibitors, there are 2,2-diphenyl-1-picrylhydrazine (DPPH), 1,4-benzoquinone, iron chloride (II), and the like, and DPPH is particularly preferred. Then, deionized water is added, followed by stirring to precipitate a mixture of polypropylene, polyvinyl acetate, a propylene-styrene diblock copolymer and a propylene-styrene-vinyl acetate triblock copolymer. The triblock copolymer is represented by the formula (8). A solid matter filtered off is heated and dried. In this process, the desired block copolymer of vinyl acetate and propylene-styrene copolymer is produced, and, in addition, a propylene-styrene copolymer (polypropylene-styrene) remaining without addition of vinyl acetate, a small amount of polystyrene and a homopolymer of only vinyl acetate (polyvinyl acetate) are also produced and contained.

Then, to the resulting product is added 25 g of polylactic acid at 190° C. in a nitrogen atmosphere, followed by stirring for 0.5 hour. As a result, polylactic acid admixes with polyvinyl acetate and further admixes with polypropylene-styrene through the block copolymer. Thus, there is obtained 113 g of a resin composition of polylactic acid, polyvinyl acetate, polypropylene and a block copolymer of vinyl acetate and propylene-styrene. Composition of this resin composition is as follows: 42.5 g of vinyl acetate, 0.5 g of styrene, 45 g of vinyl acetate-propylene-styrene copolymer and 25 g of polylactic acid. When the content of polypropylene is to be increased, polypropylene is further added in the above state, followed by stirring for 0.5 hour.

EXAMPLE 3

Another example of a method of synthesis of a mixture comprising polyvinyl acetate, polypropylene, a block copolymer of vinyl acetate and polypropylene and polylactic acid which uses ethylene in place of styrene used above. First, explanation is made of a block copolymer of polyvinyl acetate and polypropylene.

A cation polymerization initiator is added to 250 ml of anhydrous heptane in a nitrogen atmosphere of room temperature, and further 6 mmols of triethyl-aluminum diluted to 10 wt % with heptane is added, followed by stirring. As the polymerization initiator, there are metal chlorides such as titanium chloride (III) and aluminum chloride, and, in this case, titanium chloride (III) is especially preferred (amount of addition: 0.5 g). Thereafter, nitrogen gas is removed by a vacuum pump, and then the product is heated and kept at 43° C., followed by contacting with propylene gas for 3 hours under a pressure of 1 atm to absorb propylene. The double bond between carbon atoms in the absorbed propylene molecule opens and a cation additional polymerization reaction proceeds.

Here, ethylene gas in place of propylene gas is supplied and contacted with and absorbed in polypropylene for 1 hour under 0.5 atm. As a result, ethylene cationically adds to the head of polypropylene. Thereafter, in order to terminate the polymerization reaction, 1 liter of methanol with hydrochloric acid is added, followed by stirring for 5 hours. Thus, titanium chloride (III) and triethylaluminum are dissolved to precipitate polypropylene and propylene-ethylene copolymer, which are taken out by filtration.

Then, 0.48 g of 2,2'-azobis(isobutyro-nitrile) and 0.36 g of benzoyl peroxide are dissolved in 250 ml of tetrahydrofuran (or toluene), and the above precipitate is added to the solution and dissolved therein. As a result, the double bond between carbon atoms of the ethylene molecule present at the terminal of the propylene-ethylene diblock copolymer opens to give a state in which radical polymerization reaction can be started. Thereto is added 50 g of vinyl acetate, and the temperature is raised to 60° C. while stirring in a nitrogen atmosphere and this state is maintained for 5 hours. Thus, there proceed a radical addition reaction of the vinyl acetate molecule to the ethylene molecule and a radical addition reaction on the homopolymer of vinyl acetate. Thereafter, in order to terminate the radical polymerization, a small amount of a polymerization inhibitor is added to terminate the polymerization reaction. As the polymerization inhibitors, there are 2,2-diphenyl-1-picrylhydrazine (DPPH), 1,4-benzoquinone, iron chloride (II), and others, and DPPH is particularly preferred.

Then, deionized water (or petroleum benzine, in the case that toluene is used as a solvent) is added, followed by stirring to precipitate a mixture of polypropylene, polyvinyl acetate, a polypropylene-polyethylene diblock copolymer and a polypropylene-polyethylene-polyvinyl acetate triblock copolymer. The triblock copolymer is represented by the formula (9). A solid matter filtered off is heated and dried. In this process, a block copolymer of polyvinyl acetate and polypropylene which is the desired admixing agent is produced, and, in addition, a homopolymer (polypropylene) of propylene remaining without addition of polyvinyl acetate, and a homopolymer of only vinyl acetate (polyvinyl acetate) are also produced and contained. Then, to the resulting product is added 25 g of polylactic acid at 190° C. in a nitrogen atmosphere, followed by stirring for 0.5 hour.

The above block copolymer containing vinyl acetate and propylene has compatibility with both polyvinyl acetate and polypropylene and admixes with them. Polylactic acid can be admixed with polypropylene through polyvinyl acetate and the above block copolymer. Thus, there is obtained 146 g of an admixture of polylactic acid, polyvinyl acetate, polypropylene and a block copolymer of vinyl acetate and propylene (in which vinyl acetate content is 42.5 g, ethylene content is 33.5 g, propylene content is 45 g and polylactic acid content is 25 g). When the content of polypropylene is to be increased, polypropylene is further added in the above state, followed by stirring for 0.5 hour.

EXAMPLE 4

Another example of a method of synthesis of a mixture comprising polyvinyl acetate, polypropylene, a block copolymer of vinyl acetate and propylene and polylactic acid which uses polyisoprene in place of the above polystyrene and polyethylene. First, explanation is made of a block copolymer of polyvinyl acetate and polypropylene.

A cation polymerization initiator is added to 250 ml of anhydrous heptane in a nitrogen atmosphere of room temperature, and further 6 mmols of triethyl-aluminum diluted to 10 wt % with heptane is added, followed by stirring. As the polymerization initiator, there are metal chlorides such as titanium chloride (III) and aluminum chloride, and, in this case, titanium chloride (III) is especially preferred (amount of addition: 0.5 g). Thereafter, nitrogen gas is removed by a vacuum pump, and then the product is heated and kept at 43° C., followed by contacting with propylene gas for 3 hours under a pressure of 1 atm to absorb propylene. The double bond between carbon atoms in the absorbed propylene molecule opens and a cation additional polymerization reaction proceeds.

Here, 60 g of isoprene is added and then the temperature is raised to 50° C., followed by stirring for 22 hours. As a result, isoprene cationically adds to the head of polypropylene. Thereafter, in order to terminate the polymerization reaction, 1 liter of methanol with hydrochloric acid is added, followed by stirring for 5 hours. Thus, titanium chloride (III) and triethylaluminum are dissolved to precipitate polypropylene and propylene-isoprene copolymer, which are taken out by filtration.

Then, 0.48 g of 2,2'-azobis(isobutyro-nitrile) and 0.36 g of benzoyl peroxide are dissolved in 250 ml of tetrahydrofuran, and the above precipitate is added to the solution and dissolved therein. As a result, the double bond between carbon atoms of the isoprene molecule present at the terminal of the polypropylene-polyisoprene diblock copolymer opens to give a state in which radical polymerization reaction can be started. Thereto is added 50 g of vinyl acetate, and the temperature is raised to 60° C. while stirring in a nitrogen atmosphere and this state is maintained for 5 hours. Thus, there proceed a radical addition reaction of the vinyl acetate molecule to the isoprene molecule and a radical addition reaction on the homopolymer of vinyl acetate. Thereafter, in order to terminate the radical polymerization, a small amount of a polymerization inhibitor is added to terminate the polymerization reaction.

As the polymerization inhibitors, there are 2,2-diphenyl-1-picrylhydrazyine (DPPH), 1,4-benzoquinone, iron chloride (II), and others, and DPPH is particularly preferred. Then, deionized water is added, followed by stirring to precipitate a mixture of polypropylene, polyvinyl acetate, a polypropylene-polyisoprene diblock copolymer and a polypropylene-polyisoprene-polyvinyl acetate triblock copolymer. The triblock copolymer is represented by the formula (10). A solid matter filtered off is heated and dried. In this process, a block copolymer of vinyl acetate and propylene which is the desired admixing agent is produced, and, in addition, a homopolymer (polypropylene) of propylene remaining without addition of polyvinyl acetate, and a homopolymer of only vinyl acetate (polyvinyl acetate) are also produced and contained.

Then, to the resulting product is added 25 g of polylactic acid at 190° C. in a nitrogen atmosphere, followed by stirring for 0.5 hour. The above block copolymer containing vinyl acetate and propylene has compatibility with both polyvinyl acetate and polypropylene and admixes with them. Polylactic acid can admix with polypropylene through polyvinyl acetate and the above block copolymer. Thus, there is obtained 137.5 g of an admixture of polylactic acid, polyvinyl acetate, polypropylene and a block copolymer of vinyl acetate and propylene (in which vinyl acetate content is 42.5 g, isoprene content is 42 g, propylene content is 45 g and polylactic acid content is 25 g). When the content of polypropylene is to be increased, polypropylene is further added in the above state, followed by stirring for 0.5 hour.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A polymer alloy including polylactic acid comprising (A) a polylactic acid, (B) a polyalkylacrylic ester and/or a polyvinyl ester, (C) polyolefin and (D) a block copolymer containing blocks of an alkylacrylic ester and an olefin and/or a block copolymer containing blocks of a vinyl ester and an olefin.

2. A polymer alloy including polylactic acid according to claim 1, wherein the polylactic acid is represented by the following formula (1), the polyalkylacrylic ester is represented by the following formula (2), the polyvinyl ester is represented by the following formula (3), and the polyolefin is represented by the following formula (4), wherein each n is a natural number, R and $R_1$ are each a hydrogen or alkyl group and $R_2$ is an alkyl group

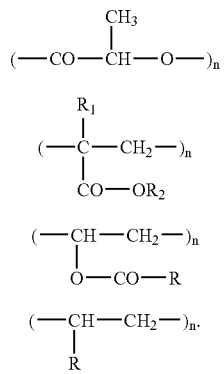

3. A polymer alloy including polylactic acid according to claim 1, wherein the block copolymer containing blocks of the alkylacrylic ester and the olefin is represented by the following formula (5) or (6), and the block copolymer containing blocks of the vinyl ester and the olefin is represented by one of the following formulas (7)–(10), wherein for (5) and (6) $R_1$ and $R_3$ are each hydrogen or alkyl and $R_2$ is alkyl and for (7)–(10) $R_1$, $R_2$, $R_3$ are each hydrogen or alkyl, and m, n, and k are each a natural number:

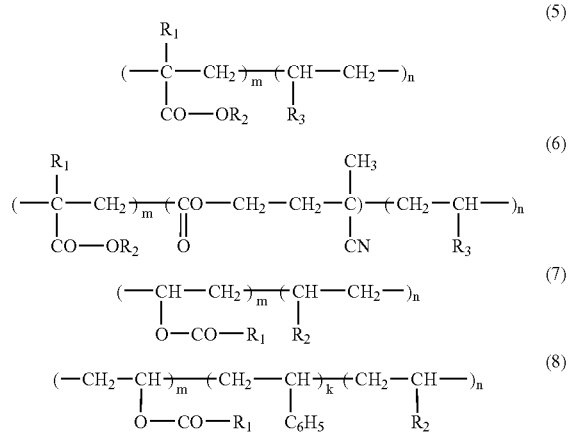

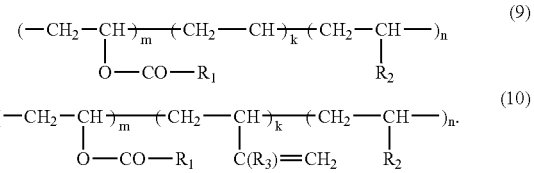

4. A polymer alloy including polylactic acid according to claim 3, wherein n in the formula (1) is $10^2$–$10^4$, n in the formula (2) is $10^1$–$10^5$, n in the formula (3) is $10^1$–$10^5$, and n in the formula (4) is $10^1$–$10^6$.

5. A polymer alloy including polylactic acid according to claim 3, wherein m is $10^1$–$10^5$ and n is $10^0$–$10^6$ in the formulas (5)–(7), and k is $10^0$–$10^6$, m is $10^1$–$10^5$ and n is $10^0$–$10^6$ in the formulas (8)–(10).

6. A polymer alloy including polylactic acid according to claim 1, wherein the polyvinyl ester is polyvinyl acetate.

7. A polymer alloy including polylactic acid according to claim 1, wherein the polyolefin is polypropylene or polystyrene.

8. A polymer alloy including polylactic acid according to claim 1, wherein the block copolymer containing blocks of a vinyl ester and an olefin is a block copolymer containing blocks of vinyl acetate and propylene, and these blocks are present at both terminals of the block copolymer.

9. A polymer alloy including polylactic acid according to claim 1, wherein the block copolymer containing blocks of an alkylacrylic ester and an olefin is a copolymer of methyl methacrylate and styrene and the polyalkylacrylic ester block and the polyolefin block are present at both terminals of the copolymer.

10. A polymer alloy including polylactic acid according to claim 8, wherein the block copolymer containing blocks of a vinyl ester and an olefin is a block copolymer containing blocks of vinyl acetate and styrene.

11. A polymer alloy including polylactic acid according to claim 9, wherein the block copolymer containing blocks of an alkylacrylic ester and an olefin is a block copolymer containing blocks of methyl methacrylate and propylene, and these blocks are present at both terminals of the block copolymer.

12. A polymer alloy including polylactic acid according to claim 8, wherein the block copolymer has propylene block and polyvinyl acetate block at both terminals and contains at least one block of ethylene, styrene, isoprene and butadiene between the above terminal blocks.

* * * * *